2,934,516

CARBOXY-COPOLYMER EPOXIDE COMPOSITIONS AND THEIR PREPARATION

Darrell D. Hicks, Louisville, Ky., assignor to Devoe & Raynolds Company, Inc., a corporation of New York No Drawing. Application November 4, 1957
Serial No. 694,105

8 Claims. (Cl. 260—45.5)

This invention, in one of its aspects, relates to thermosetting compositions. In another aspect, the invention pertains to the production of a complex resin particularly suitable for thermoset castings, molded articles, and the like.

In accordance with an embodiment of this invention, improved thermosetting compositions are produced on mixing or blending a polyepoxide, a butenedioic acid half ester with an aromatic alcohol and a polymerizable vinylidene compound containing a single $CH_2=C<$ group. The resulting thermosetting composition can be hardened under applied pressure to form molded objects, or it can be hardened in the form of cast shapes. The hardening takes place without difficulty, and the thermoset resin has extremely desirable strength properties. In the form of cast bodies the thermoset resin may have a tensile strength of about 9,000 to 12,000 p.s.i., a flexural strength of about 16,000 to 20,000 p.s.i. or higher, and an impact strength of 0.40 to 0.50 ft. lb./in. notch.

Half esters suitable for blending or mixing with polyepoxides, along with vinylidene monomers, in making the thermosetting compositions of this invention are prepared by reacting one mol of a butenedioic acid or anhydride with one mol of an aromatic alcohol. It has been discovered that when an aromatic alcohol-half ester is used thermoset resins are obtained having outsanding tensile and flexural properties not obtainable when an aliphatic alcohol-half ester is used. By a butenedioic acid is meant an unsaturated dibasic acid of the formula:

HOOCRC:CRCOOH, where R is a hydrogen or methyl substituent. Included are cis-butenedioic acid (maleic acid), transbutenedioic acid (fumaric acid), and methyl butenedioic acid (citraconic acid). It is noted, however, that the anhydride, where it exists, is preferred for use in the preparation of the half ester.

The term "aromatic alcohol" is used herein to mean a compound having an aromatic nucleus and an aliphatic side chain in which a hydroxyl group has replaced a hydrogen atom in the side chain, as in benzyl alcohol. Suitable aromatic alcohols are monohydric and dihydric, monomeric and polymeric aromatic alcohols. Examples of monomeric alcohols are benzyl alcohol, alpha-alpha dimethyl benzyl alcohol, alpha-ethyl benzyl alcohol, alpha-butyl alpha-methyl benzyl alcohol, alpha-butyl alpha-ethyl benzyl alcohol, phenethyl alcohol, alpha-ethyl phenethyl alcohol, beta-ethyl phenethyl alcohol, beta-ethyl beta-methyl phenethyl alcohol, alpha-butyl beta-ethyl phenethyl alcohol, phenyl butanediol, methyl phenyl butanediol, 2-ethyl-1-phenyl butane-1,2-diol, 1-phenyl-1,2-propanediol, etc. Suitable polymeric aromatic alcohols are made, for example, by addition polymerization of styrene oxide to make a dihydric alcohol by the method used for making polyethylene glycol from ethylene oxide. Included as aromatic alcohols are phenyl and substituted-phenyl ethers of glycols, as well as hydroxyl-substituted polyethers, for example, 2-phenoxy ethanol, 1-phenoxy-2-propanol, 2-(p-butyl phenoxy)ethanol, o-butyl phenoxy propanol, chlorophenoxy propanol, cyclohexyl phenoxy propanol, polymerized glycidyl phenyl ether, 2,2-bis(p-2 - hydroxy - 1 - propoxyphenyl) - propane, 2,2 - bis(p-2-hydroxy, 1-methyl,1-propoxyphenyl)propane, and the like.

Any of the known polyepoxides can be employed in the preparation of the thermosetting compositions of this invention. Useful polyepoxides are glycidyl polyethers of both polyhydric alcohols and polyhydric phenols, epoxidized fatty acids or drying oil acids, epoxidized diolefins, epoxidized di-unsaturated acid esters, as well as epoxidized unsaturated polyesters, so long as they contain more than one epoxide group per molecule.

Glycidyl polyethers of polyhydric phenols are made from the reaction of a polyhydric phenol with epihalohydrin or glycerol dihalohydrin, and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy equivalency greater than one. Dihydric phenols that can be used for this purpose include bisphenol, resorcinol, catechol, hydroquinone, methyl resorcinol, 2,2-bis-(4-hydroxyphenyl)butane, 4,4'-dihydroxybenzophenone, bis(4 - hydroxyphenyl)ethane, and 1,5-dihydroxy naphthalene. The preparation of polyepoxides from polyhydric phenols and epihalohydrin is described in U.S. Patents 2,467,171, 2,538,072, 2,582,985, 2,615,007 and 2,698,315, the proportion of the halohydrin (epichlorhydrin or glycerol dichlorhydrin) to dihydric phenol being at least about 1.2 to 1, up to around 10 to 1.

While the invention is applicable to epoxides generally, preferred polyepoxides are glycidyl polyethers of aromatic polyhydric compounds having weights per epoxide group of 180 to 2000. Glycidyl ethers of polyhydric alcohols are also well known. These polyepoxides are made by reacting at least about two mols of an epihalohydrin with one mol of a polyhydric alcohol such as ethylene glycol, pentaerythritol, etc., followed by dehydrohalogenation according to U.S. Patent 2,581,464.

In addition to polyepoxides made from alcohols or phenols and an epihalohydrin, polyepoxides made by the known peracid method are also suitable. Epoxides of unsaturated esters, polyesters, diolefins and the like can be prepared by reacting the unsaturated compound with a peracid. The reaction is one of epoxidation of compounds with isolated double bonds, at a temperature sufficiently low so that the acid resulting from the peracid, for example, acetic acid in the case of peracetic acid, does not react with the resulting epoxide group to form hydroxyl groups and ester linkages. Preparation of polyepoxides by the peracid method is described in various periodicals and patents and such compounds as butadiene, ethyl linoleate, as well as di- or tri-unsaturated drying oils or drying oil acids, esters and polyesters can all be converted to polyepoxides.

Epoxidized drying oils are also well known, these polyepoxides usually being prepared by reaction of a peracid such as peracetic acid or performic acid with the unsaturated drying oil according to U.S. Patent 2,569,502.

Desirable esters are prepared by reacting unsaturated aldehydes with butadiene to form unsaturated cyclic aldehydes. These can be condensed by the Tischenko reaction to form esters or reduced to form alcohols which can subsequently be reacted with acids to form esters. A desirable ester is prepared by a Diels-Alder reaction of butadiene and crotonaldehyde to form a cyclic unsaturated aldehyde having the formula:

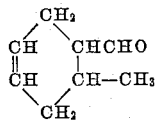

or

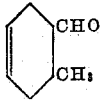

Two mols of this aldehyde are then condensed by the Tischenko reaction to form an unsaturated condensate which can then be epoxidized with a peracid to give a compound, 3,4 - epoxy - 6 - methyl cyclohexylmethyl-3,4-epoxy-6-methylcyclohexanecarboxylate, having the formula:

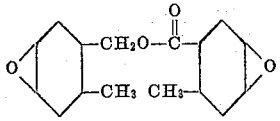

The aldehyde resulting from the reaction of crotonaldehyde and butadiene can also be reduced to the corresponding alcohol and two mols of the alcohol can be reacted with one mol of a dibasic acid to form an epoxidizable ester.

In addition to epoxidized drying oils, butadiene dioxide, and monomeric esters, polymeric esters can also be epoxidized by the peracid method as described in Australian Patent 11,862, 1955. Examples of these unsaturated polyesters are those made from saturated polyhydric alcohols and unsaturated polybasic acids, for example, maleic acid, 2-butenedioic acid, 4-cyclohexene-1,2-dicarboxylic acid, dimerized linoleic acid, etc., and such alcohols as ethylene glycol, 1,6-hexanediol, 3-ethylhexanediol-1,3, pentaerythritol, etc. Other polyesters which can be epoxidized with peracetic or other peracids are made from saturated acids and unsaturated alcohols, for example, 2-butenediol-1,4, 1,5-hexanediene-3,4-diol, 2-pentene-1,5-diol, cyclohexenediol-2,5, etc., reacted with such saturated acids or acid anhydrides as malonic succinic, glutaric, terephthalic, etc. In the formation of these polyesters the acid is reacted with an excess of up to fifty percent excess of the alcohol. The polyesters can then be epoxidized by the use of performic, perbenzoic, peracetic and the like in an amount of one mol of peracid for every unsaturated group to be epoxidized and generally in the presence of a solvent such as chloroform.

Vinylidene compounds blended with polyepoxides and butenedioic acid half esters to produce the thermosetting compositions of this invention are polymerizable monomers containing a single vinylidene group. Particularly important are vinylidene aromatic compounds, especially monofunctional vinylidene aromatic compounds, e.g., styrene, vinyl toluene, alpha-methyl styrene, the halostyrenes, etc. Also suitable are saturated alcohol esters, amides, N-alkyl amides and N,N-dialkyl amides of acrylic, methacrylic and crotonic acids; and acrylonitrile and methacrylonitrile. Saturated alcohols forming the acrylic or methacrylic acid esters of saturated alcohols include alcohols of not more than twenty carbon atoms. Likewise, in the case of N-alkyl or N,N-dialkyl acrylamides or methacrylamides, the total number of alkyl carbon atoms will not exceed twenty. In other words, preferred vinylidene monomers include alpha-beta unsaturated monocarboxylic acid esters of saturated alcohols, the acids having not more than four carbon atoms and the alcohols having not more than twenty carbon atoms; vinyl aliphatic cyanides of not more than four carbon atoms; monofunctional vinylidene aromatic compounds; and amides of alpha-beta unsaturated monocarboxylic acids of not more than four carbon atoms. Within the scope of this invention amides of these alpha-beta unsaturated acids include N-alkyl amides and N,N-dialkyl amides of the alpha-beta unsaturated acid, e.g., N-alkyl acrylamide, wherein the number of N-carbon atoms does not exceed twenty. It is seen that in the case of N,N-dialkyl amides the alkyl chains will be shorter than in the case of N-alkyl amide since in either case the total number of carbon atoms will not exceed twenty.

Thus, preferred vinylidene compounds are styrene, vinyl toluene, isopropenyl toluene, the various dialkyl styrenes, ortho-, meta- and para-chlorostyrenes, bromo styrenes, fluoro styrenes, cyano styrenes, vinyl naphthalene, the various alpha-substituted styrenes, e.g., alpha-methyl styrenes, alpha-methyl para-methyl styrenes, as well as various di-, tri- and tetrachloro, bromo and fluoro styrenes, and acrylic, methacrylic and crotonic esters of saturated alcohols. These esters will be referred to as alkyl esters of acrylic or methacrylic acid. They include the methyl, ethyl, propyl, isopropyl, N-butyl, isobutyl, sec-butyl, tert-butyl, amyl, hexyl, heptyl octyl, decyl, dodecyl, etc. esters of acrylic, methacrylic and crotonic acids. The alkyl esters of acrylic, methacrylic or crotonic acids contain no more than twenty alkyl carbon atoms, and preferably not over twelve carbon atoms.

Other known vinylidene monomers can, of course, be used in the prepartion of the thermosetting compositions of this invention, such as monofunctional vinyl heterocyclic compounds, for instance, N-vinyl carbazole, vinyl pyridine, vinyl furane, vinyl cyclohexane, vinyl dibenzofuran; monovinyl ethers, for example, ethyl vinyl ether, ethyl methallyl ether, vinyl butyl ether, phenyl vinyl ether, methyl vinyl ether, and others of not over twenty carbon atoms; and monovinyl ketones, for instance, methyl vinyl ketone, methyl allyl ketone, ethyl vinyl ketone and the like of not over twenty carbon atoms. Also contemplated are the vinyl halides such as vinyl chloride, the various vinylidene compounds, vinylidene chloride, vinylidene bromide, etc.

In the preparation of thermosetting compositions according to this invention the butenedioic acid, preferably the anhydride, is esterified by known methods with sufficient aromatic alcohol to form the half ester. The resulting half ester, the polyepoxide, and the vinyl monomer are then blended or mixed. In the case of a monohydric aromatic alcohol, one mol of alcohol per mol of butenedioic acid or anhydride is used; whereas in the case of a dihydric alcohol, two mols of butenedioic acid, or the acid anhydride, per mol of alcohol are used. In the thermosetting composition the polyepoxide is usually present in a ratio of at least one epoxide group per carboxyl group of half ester, usually not more than two epoxide groups being used since the cost of the resulting composition is increased thereby. The vinylidene compound desirably is present in an amount of from twenty to seventy per cent by weight on the total composition.

Whereas similar prior art processes normally only use a peroxide catalyst which promotes polymerization, this invention involves the use of two catalysts, one to promote the carboxyepoxy reaction between the polyepoxide and butenedioic acid half ester, and one to promote the concomitant polymerization reaction taking place between the butenedioic acid half ester and the vinylidene monomer. Thus it is desirable to carry out the two reactions concomitantly.

Included among catalysts for promoting the polymerization of the butenedioic acid half ester with the vinyl monomer are hydrogen peroxide, various organic peroxides, for example, ascaridol, acetyl and benzoyl peroxide, dibutyryl and dilauryl peroxide, caprylyl peroxide, as well as partially oxidized aldehydes which can contain peroxides, urea-peroxide, succinic acid peroxide, and the like. Other peroxides are fatty acid peroxides, such as coconut oil peroxides, stearic peroxide, lauric peroxide, and oleic peroxide. Also intended are alcoholic peroxides such as tertiary butyl hydroperoxides and other peroxides such as cumene hydroperoxide, tertiary butyl perbenzoate, hydroxyheptyl peroxide and chlorobenzoyl peroxide.

A particularly important embodiment of this invention is the use of an activator for the epoxy-carboxy reaction since much better results are obtained thereby. These epoxy-carboxy catalysts are generally basic materials and are well known in the art, for example, amines, amine salts, quaternary ammonium hydroxides and quaternary ammonium salts. Any of the catalysts which are activators for epoxy-carboxy reactions can be used. However, since primary and secondary amines enter into the reaction, preferred catalysts are tertiary amines, tertiary amine salts and quaternary ammonium compounds, e. g., quaternary ammonium hydroxide, and quaternary ammonium salts. Examples are trimethyl amine, dimethylethyl amine, triethyl amine, ethyl dipropyl amine, benzyl trimethyl ammonium hydroxide, benzyltrimethyl ammonium chloride, benzyltrimethyl ammonium acetate, benzyltriethyl ammonium formate, tripropylbenzyl ammonium chloride, ethyl pyridine chloride, benzyl dimethyl ammonium hexoate, alphamethylbenzyldimethyl ammonium 2-ethyl hexoate, etc.

Thermoset resins prepared from thermosetting compositions in accordance with this invention normally are prepared by first heating the thermosetting composition using the catalysts to form a gel and subsequently heating the gel at a higher curing temperature to bring about a maximum amount of cross-linking. Gel temperatures desirably are in the range of 65° C. to 90° C., the product, in the case of castings, being heated slowly to avoid bubbling or foaming, generally several hours depending upon the thickness of the mold. The gel is then subsequently further heated to bring about maximum cross-linking at curing temperatures of 120–150° C. for two to four hours, preferably 150° C. for three hours.

In order more fully to illustrate the invention, the following examples are included. The examples are for the purposes of illustration only and it is intended that no undue limitation be read into the invention by reference to the examples and the discussion thereof.

In the following examples, polyepoxides, vinylidene monomers and alcohol-maleic acid half esters are combined in the presence of a catalyst, poured into a mold, and are cured by heating to produce castings with outstanding physical properties. The hardness of these castings is reported as an alpha-hardness, the alpha-hardness test being an indentation hardness test eliminating residual indentations of the usual Rockwell Hardness Test. The mold employed in the preparations of the castings in the examples is made by wrapping two 8" by 12" by ¼" glass plates with heavy duty cellophane so that one side of each plate is free of wrinkles. These plates are then assembled, smooth side inward, into a mold by separating the plates with ⅛" aluminum spacers to adjust the cavity thickness and by using polyvinyl chloride-acetate plastic tubing as a gasket on three of the four edges of the glass plates. The two glass plates are then clamped together using 6 C clamps.

The polyepoxides employed in the following examples are prepared in the manner described in U.S. Patents 2,615,007, 2,615,008, 2,582,985, 2,485,160 and 2,581,464 by the condensation of varying proportions of epichlorhydrin to bisphenol and subsequent dehydrohalogenation with sodium hydroxide.

The table which follows indicates the ratio of epichlorhydrin to bisphenol used to prepare the polyepoxides and in the examples which follow the polyepoxides will be referred to by their epoxide equivalency, e. g., a polyepoxide with an epoxide equivalent of 460 will be called Epoxide 460.

| Epoxide No. | Ratio (mols) | | Epoxide Equivalent |
|---|---|---|---|
| | Epichlorhydrin | Bisphenol | |
| 460 | 1.57 | 1.0 | 460 |
| 190 | 10.0 | 1.0 | 190 |
| 950 | 1.21 | 1.0 | 950 |

All parts in the following examples are intended to mean parts by weight.

EXAMPLE 1

A benzyl alcohol-maleic half ester with a weight per carboxyl group of 206, is prepared by charging into a one liter, three necked flask equipped with an agitator, thermometer and reflux condenser, 157.5 parts of USP benzyl alcohol and 142.5 parts of maleic acid anhydride, these weights representing a molar ratio of one to one. The reaction mixture is heated to 120° C. and is maintained at this temperature for a period of one hour resulting in a clear yellow solution of benzyl alcohol-maleic acid anhydride half ester. The solution is poured into a glass container and, on standing at room temperature, results in a crystalline product.

In a 400 ml. breaker, 103.8 parts of Epoxide 460 (0.224 epoxide equivalent) and 150.0 parts (fifty percent based on the total weight of the three reactants) of styrene containing 500 p.p.m. tertiary butyl catechol are combined and heated with agitation until all of the Epoxide 460 is in solution. The solution is then cooled to around 50° C. whereupon 46.2 parts (0.224 carboxyl equivalent) of the benzyl alcohol-maleic acid anhydride half ester of this example are added and stirred into the solution. After cooling to room temperature, 3.0 parts of a 50/50 mixture of benzoyl peroxide and tricresyl phosphate and 3.0 parts of a sixty percent aqueous solution of benzyl trimethyl ammonium chloride are stirred into the mixture. The resulting solution is poured into the mold previously described, which is pre-heated for thirty minutes as 75° C. The filled mold is then placed in a 75° C. oven until a gel is obtained (approximately eighteen hours) after which time the mold is heated at 150° C. for three hours. The casting obtained has very good physical properties:

Tensile strength____ 10,000 pounds per square inch.
Elongation_____ 4 to 5 percent.
Flexural strength___ 17,500 pounds per square inch.
Impact strength____ 0.45 foot pounds per inch of notch.
Alpha-Hardness___ 108.

EXAMPLE 2

Following the procedure described in Example 1, 4.8 parts (0.120 carboxyl equivalent) of the benzyl alcohol-maleic half ester prepared in Example 1, 55.2 parts (0.120 epoxide equivalent) of Epoxide 460 and 120.0 parts (sixty percent based on the total weight of the three reactants) of styrene containing 500 p.p.m. of tertiary butyl catechol are combined in the presence of 2.0 parts of a paste consisting of fifty percent benzoyl peroxide and fifty percent tricresyl phosphate and 2.0 parts of a sixty percent aqueous solution of benzyltrimethyl ammonium chloride and are poured into the previously described mold (pre-heated for thirty minutes at 75° C.). The mold is placed in an oven at 75° C. until a gel is obtained (approximately twenty-two hours), after which time the mold is baked in a 150° C. oven for three hours. The resulting casting has the following physical properties:

Tensile strength____ 9,800 pounds per square inch.
Elongation_____ 4 to 5 percent.
Flexural strength___ 16,000 pounds per square inch.
Impact strength____ 0.44 foot pounds per inch of notch.
Alpha-Hardness___ 108.

EXAMPLE 3

An ethylene glycol phenyl ether-maleic half ester is prepared by heating at 120° C. with agitation, in a one liter, three necked flask equipped with a thermometer, agitator, and reflux condenser, 351.0 parts of ethylene glycol phenyl ether and 249.0 parts of maleic anhydride. The weights of the two reactants represent a molar ratio of one to one. The flask contents are maintained at 120° C. for a period of one hour, after which time the reaction mixture is cooled and poured into a container where is crystallizes on standing to a white solid.

In accordance with the procedure of Example 1, 33.8 parts (0.143 carboxyl equivalent) of the half ester of this example, 66.2 parts (0.143 epoxide equivalent) of Epoxide 460 and 100.0 parts (fifty percent based on the total weight of the three reactants) of styrene containing 500 p.p.m. tertiary butyl catechol are combined in the presence of 4.0 parts of a paste consisting of fifty percent benzoyl peroxide and fifty percent tricresyl phosprate and 0.4 part of dimethylaminomethyl phenol. The resulting mixture is poured into the aforedescribed mold (pre-heated for thirty minutes in a 75° C. oven) and is heated in a 75° C. oven until a gel is obtained (approximately twenty-three hours), after which it is baked at 150° C. for three hours resulting in a casting with the following physical properties:

Tensile strength____ 9,600 pounds per square inch.
Elongation_____ 5 to 6 percent.
Flexural strength___ 16,500 pounds per square inch.
Impact strength____ 0.46 foot pounds per inch of notch.
Alpha-Hardness____ 108.

EXAMPLE 4

To prepare a maleic half ester of ethylene glycol p-tert-butylphenyl ether, 399.0 parts of ethylene glycol p-tert-butylphenyl ester and 201.0 parts of maleic acid anhydride are charged into a one liter, three necked flask equipped with an agitator, thermometer and reflux condenser. The weights of the reactants represent a molar ratio of one to one. The reaction mixture is heated to 120° C. to 130° C. and is maintained at this temperature for one hour, after which the contents of the flask are poured into a glass container and are allowed to crystallize on standing at room temperature to a white crystalline solid.

In accordance with the procedure described in Example 1, 39.8 parts (0.136 carboxyl equivalent) of maleic half ester of this example, 61.2 parts (0.136 epoxide equivalent) of Epoxide 460 and 100.0 parts (fifty percent based on the total weight of the three reactants) of styrene containing 500 p.p.m. of tertiary butyl catechol are combined in the presence of 2.0 grams of a paste consisting of a 50/50 mixture of benzoyl peroxide and tricresyl phosphate and 0.4 part of dimethylaminomethyl phenol. The resulting solution is poured into the aforedescribed mold (pre-heated for thirty minutes in a 75° C. oven). The mold is placed in a 75° C. oven until a gel results (approximately sixteen hours), after which time it is baked in a 150° C. oven for three hours. The casting obtained has these physical properties:

Tensile strength____ 9,000 pounds per square inch.
Elongation_____ 4 to 5 percent.
Flexural strength___ 16,300 pounds per square inch.
Impact strength____ 0.43 foot pounds per inch of notch.
Alpha-Hardness____ 110.

EXAMPLE 5

Following the procedure of Example 1, 17.4 parts (0.085 carboxyl equivalent) of the maleic half ester of Example 1, 12.7 parts (0.085 epoxide equivalent) of 3,4-epoxy-6-methyl cyclohexyl methyl-3,4-epoxy-6-methyl cyclohexane carboxylate and 20.1 parts (forty percent based on the total weight of the three reactants) of styrene containing 500 p.p.m. of tertiary butyl catechol are combined in the presence of 0.5 part of a paste consisting of fifty percent benzoyl peroxide and fifty percent tricresyl phosphate and 0.5 part of a sixty percent aqueous solution of benzyltrimethyl ammonium chloride and are poured into an aluminum dish which is placed inside a closed container to prevent the escape of volatile material. The container is placed in a 75° C. oven until a gel results (approximately twenty-five minutes), after which it is baked at 150° C. for three hours. The casting obtained is clear, somewhat brittle, and extremely hard.

EXAMPLE 6

An epoxidized polyester with a weight per epoxide of 353 is prepared by epoxidizing, by means of the peracetic acid method, a polyester prepared from three mols of tetrahydrophthalic anhydride and four mols of 1,5-pentanediol. To prepare the epoxide, 1350 grams of the polyester are reacted with 945 grams of forty-two percent peracetic acid in the presence of 50 grams of sodium acetate trihydrate. In accordance with the procedure of Example 1, 16.0 parts (0.044 epoxide equivalent) of the epoxidized polyester of this example, 9.1 parts (0.044 carboxyl equivalent) of the benzyl alcohol-maleic half ester of Example 1 and 25.0 parts of styrene (fifty percent based on the total weight of the three reactants) are combined in the presence of 0.5 part of a paste consisting of fifty percent benzoyl peroxide and fifty percent tricresyl phosphate and 0.5 part of a sixty percent aqueous solution of benzyltrimethyl ammonium chloride and are poured into an aluminum dish which is placed in a closed container to prevent the escape of volatile material. The container is heated in a 65° C. oven until gelation results (approximately two and a half hours), after which time it is heated at 150° C. for three and a half hours to produce a rigid casting with excellent flexibility and toughness.

EXAMPLE 7

Following the procedure of Example 1, 13.9 parts (0.054 epoxide equivalent) of an epoxidized soy bean oil having a weight per epoxide of 257, prepared by partially oxidizing the double bonds of soy bean oil to epoxide groups using peracetic acid, 11.1 parts (0.054 carboxyl equivalent) of the benzyl alcohol-maleic half ester of Example 1 and 25.0 parts of vinyl toluene (fifty percent based on the total weight of the three reactants) are combined in the presence of 0.5 part of a paste consisting of fifty percent benzoyl peroxide and fifty percent tricresyl phosphate and 0.5 part of a sixty percent aqueous solution of benzyltrimethyl ammonium chloride and are poured into an aluminum dish which is placed inside a closed container. The container is heated in a 65° C. oven until gelation results (approximately two and a half hours) and then is baked at 150° C. for three hours to produce a clear, extremely flexible casting exhibiting very good toughness.

EXAMPLE 8

Following the procedure described in Example 1, 24.7 parts (0.026 epoxide equivalent) of Epoxide 950, 5.4 parts (0.026 carboxyl equivalent) of the benzyl alcohol-maleic half ester of Example 1 and 20.0 parts of methyl methacrylate (forty percent based on the total weight of the three reactants) are combined in the presence of 0.50 part of a paste consisting of fifty percent benzoyl peroxide and fifty percent tricresyl phosphate and 0.5 part of benzyltrimethyl ammonium chloride (as a sixty percent aqueous solution). The blend is poured into a suitable container which is then covered to prevent the escape of volatile material, and is heated at 65° C. until a gel is obtained (approximately eighteen hours), after which time it is heated for three hours at 150° C. to produce a clear, very hard and brittle casting.

As a basis of comparison of properties of the castings prepared from half esters of aromatic alcohols in the preceding examples, castings are prepared from maleic half esters of aliphatic alcohols, polyepoxides and vinylidene monomers. The maleic half esters of butyl alcohol (Aliphatic Alcohol A), 2-ethyl hexyl alcohol (Aliphatic Alcohol B) and propylene glycol methyl ether (Aliphatic Alcohol C), are prepared following the procedure of Example 1 from a molar ratio of maleic acid anhydride to aliphatic alcohol of one to one. The maleic half ester, polyepoxide, and vinylidene monomer are combined in the presence of catalysts, are poured into the previously described mold (pre-heated at 75° C. for thirty minutes) are heated in a 100° C. oven until a gel is obtained and then baked at 150° C. for three hours. The table which follows will indicate the weight percent of the composition of the casting and its physical properties. For purposes of comparison, ultimate tensile, ultimate flexure and impact properties of products of preceding examples of this invention are repeated. The aromatic alcohols employed are designated by the example Nos. in which the castings included in Table 9 are prepared.

*Table 9*

| Maleic Half Ester Of | Polyepoxide | Casting Composition | | | Casting Properties | | |
|---|---|---|---|---|---|---|---|
| | | Wt. percent Polyepoxide | Wt. percent Half Ester | Wt. percent Styrene | Tensile Strength, Lb./sq. in. | Flexural Strength, Lb./sq. in. | Hardness, Alpha |
| Aliphatic Alcohol A | Epoxide 460 | 36 | 14 | 50 | 7,000 | 12,200 | 100 |
| Aliphatic Alcohol B | ----do------ | 34 | 16 | 50 | 6,800 | 12,000 | 94 |
| Aliphatic Alcohol C | ----do------ | 36 | 14 | 50 | 7,400 | 14,000 | 104 |
| Aromatic Alcohol, Ex. 1 | ----do------ | 35 | 15 | 50 | 10,000 | 17,500 | 108 |
| Aromatic Alcohol, Ex. 3 | ----do------ | 33 | 17 | 50 | 9,600 | 16,500 | 108 |
| Aromatic Alcohol, Ex. 4 | ----do------ | 31 | 19 | 50 | 9,000 | 16,300 | 110 |

The preceding examples clearly show the advantageous tensile and flexural properties obtainable in accordance with this invention. The products have very high tensile strengths; yet as the foregoing examples show elongation is still good. Table 9 illustrates the markedly improved flexural and tensile properties obtainable when aromatic alcohol-half esters are used rather than aliphatic alcohol-half esters. Thus, when the benzyl alcohol-maleic half ester is employed in a composition consisting of fifteen percent half ester, thirty-five percent Epoxide 460 and fifty percent styrene, the ultimate tensile strength is 10,000 and the ultimate flexural strength is 18,500 as compared with tensile strengths of 6000 or 7000 and flexural strengths of 12,000 or 14,000 which are obtained when aliphatic alcohol-half esters are employed in corresponding compositions. In addition, Example 2 shows that even when as much as sixty percent styrene is used, a resin having a tensile strength of 9,800 and a flexural strength of 16,000 is obtained.

It is understood that many compositions are obtainable by the practice of this invention. By variations in manipulations a wide variety of shaped objects, molded articles and castings can be made and in addition forms can be prepared which can be milled to produce various other articles. It is the purpose of this invention to provide a means for the production of resins which lend themselves to these end products, particularly those requiring remarkable flexural and tensile properties. It is not intended that the invention should be limited by modifications and variations in the process of the invention which will be effected in particular instances by those requiring products having specific uses. Modifications and variations which occur to those skilled in the art are deemed to be within the scope of this invention.

What is claimed is:

1. A process for preparing thermoset resins which comprises (a) mixing (1) a polyepoxide selected from the group consisting of epoxidized esters and epoxidized diolefins, each having at least two epoxide groups; glycidyl polyethers of polyhydric alcohols; and glycidyl polyethers of polyhydric phenols; (2) a dicarboxylic acid-aromatic alcohol acid ester wherein the dicarboxylic acid is selected from the group consisting of maleic acid and fumaric acid, and the aromatic alcohol is selected from the group consisting of phenylcarbinol; the methyl, ethyl, propyl, and butyl, phenylcarbinol; phenethyl alcohol; the methyl, ethyl, propyl, and butyl, phenethyl alcohols; phenyl butanediol; the methyl and ethyl, phenyl butanediols; phenyl propanediol; and phenoxy ethanols and propanols; and (3) a vinylidene compound selected from the group consisting of styrene; the methyl styrenes; the halo styrenes; vinyl naphthalene; acrylonitrile; methacrylonitrile; N-alkyl and N,N-dialkyl amides of acids selected from the group consisting of acrylic and methacrylic acids, the number of carbon atoms in each N-alkyl radical not exceeding twenty; alkyl esters of acids selected from the group consisting of acrylic and methacrylic acids, the number of carbon atoms in the alkyl group not exceeding twenty; vinyl pyridine; vinyl furane; vinyl cyclohexane; monovinyl ketones of not over twenty carbon atoms; and vinyl halides; said mixture containing one to two epoxide groups of (1) per carboxyl group of (2) and from twenty to seventy percent of (3) by weight based on the total composition, and (b) heating the mixture at a temperature of 65° C. to 150° C.

2. The process of claim 1 wherein the reaction is carried out in the presence of a peroxide polymerization catalyst and a carboxy-epoxy catalyst selected from the group consisting of tertiary amines and their salts and quaternary ammonium compounds.

3. The process of claim 1 wherein the vinylidene compound is an alkyl ester of methacrylic acid having not more than twenty carbon atoms in the alkyl group.

4. The process of claim 1 wherein the polyepoxide is 3,4-epoxy-6-methyl cyclohexyl methyl-3,4-epoxy-6-methyl cyclohexane carboxylate, wherein the dicarboxylic acid-aromatic alcohol acid ester is a maleic half ester of ethylent glycol p-tert-butyl phenyl monoether and wherein the vinylidene compound is an alkyl ester of acrylic acid having not more than twelve carbon atoms in the alkyl group.

5. The process of claim 2 wherein the dicarboxylic acid-aromatic alcohol acid ester is a maleic acid-methyl benzyl alcohol half ester, and wherein the vinylidene compound is alpha-methylstyrene.

6. The process of claim 2 wherein the dicarboxylic acid-aromatic alcohol acid ester is a maleic acid-ethylene glycol phenyl monoether half ester, and wherein the vinylidene compound is vinyl toluene.

7. The process of claim 2 wherein the polyepoxide is glycidyl polyether of a polyhydric phenol, wherein the dicarboxylic acid-aromatic alcohol acid ester is a maleic acid-phenylcarbinol half ester and wherein the vinylidene compound is a styrene.

8. A thermosetting composition comprising in admixture (1) a polyepoxide selected from the group consisting of epoxidized esters and epoxidized diolefins, each having at least two epoxide groups; glycidyl polyethers of polyhydric alcohols; and glycidyl polyethers of polyhydric phenols; (2) a dicarboxylic acid-aromatic alcohol acid ester wherein dicarboxylic acid is selected from the group consisting of maleic acid and fumaric acid, and the aromatic alcohol is selected from the group consisting of phenylcarbinol; the methyl, ethyl, propyl, and butyl, phenylcarbinols; phenethyl alcohol; the methyl, ethyl, propyl, and butyl, phenethyl alcohols; phenyl butanediol; the methyl, and ethyl, phenyl butanediols; phenyl propanediol and phenoxy ethanols and propanols; and (3) a vinylidene compound selected from the group consisting of styrene; the methyl styrenes, the halo styrenes; vinyl naphthalene; acrylonitrile; methacrylonitrile; N-alkyl and N,N-dialkyl amides of acids selected from the group consisting of acrylic and methacrylic acids, the number of carbon atoms in each N-alkyl radical not exceeding twenty; alkyl esters of acids selected from the group consisting of acrylic and methacrylic acids, the number of carbon atoms in the alkyl group not exceeding twenty; vinyl pyridine; vinyl furane; vinyl cyclohexane; monovinyl ketones of not over twenty carbon atoms; and vinyl halides; said mixture containing one to two epoxide groups of (1) per carboxyl group of (2) and from twenty to seventy percent of (3) by weight based on the total composition.

References Cited in the file of this patent

UNITED STATES PATENTS 2,826,562  Shokal _____ Mar 11, 1958

FOREIGN PATENTS 734,848  Great Britain _____ Aug. 10, 1955

UNITED STATES PATENT OFFICE
CERTIFICATE OF CORRECTION

Patent No. 2,934,516            April 26, 1960

Darrell D. Hicks

It is hereby certified that error appears in the printed specification of the above numbered patent requiring correction and that the said Letters Patent should read as corrected below.

Column 6, line 43, for "minutes as" read -- minutes at --; line 54, for "4.8" read -- 24.8 --; column 7, line 11, for "is crystallizes" read -- it crystallizes --; line 37, for "p-tert-butylphenyl ester" read -- p-tert-butylphenyl ether --.

Signed and sealed this 11th day of October 1960.

(SEAL)
Attest:

KARL H. AXLINE
Attesting Officer

ROBERT C. WATSON
Commissioner of Patents